United States Patent
Mchatet

(10) Patent No.: US 7,607,627 B1
(45) Date of Patent: Oct. 27, 2009

(54) CLIP HOLDER FOR EYEGLASSES

(76) Inventor: Hamid Mchatet, 12958 SW. 29 Ct., Miramar, FL (US) 33027

( * ) Notice: Subject to any disclaimer, the term of this patent is extended or adjusted under 35 U.S.C. 154(b) by 0 days.

(21) Appl. No.: 12/046,570

(22) Filed: Mar. 12, 2008

(51) Int. Cl.
*A47G 1/10* (2006.01)
(52) U.S. Cl. .............. 248/316.7; 248/902; 248/229.16; 248/74.1; 248/74.4; 248/316.6; 248/313; 248/309.1; 248/205.1; 24/3.12; 24/3.3; 24/3.8
(58) Field of Classification Search .............. 248/316.7, 248/902, 229.16, 74.1, 74.4, 316.6, 313, 248/309.1, 205.1; 24/3.3, 3.8, 3.12
See application file for complete search history.

(56) References Cited

U.S. PATENT DOCUMENTS

| | | | | | |
|---|---|---|---|---|---|
| 556,209 | A | * | 3/1896 | Quinn | 24/3.11 |
| 2,614,305 | A | * | 10/1952 | Yeardley | 24/3.8 |
| 3,019,954 | A | * | 2/1962 | Faltin | 224/483 |
| 3,267,534 | A | * | 8/1966 | Dansereau | 24/3.1 |
| 5,069,416 | A | * | 12/1991 | Ennis | 248/231.81 |
| 5,082,225 | A | * | 1/1992 | Nespoli | 248/231.81 |
| 5,137,242 | A | * | 8/1992 | Reath | 248/309.1 |
| 5,316,252 | A | * | 5/1994 | Charnow et al. | 248/224.51 |
| 5,351,098 | A | * | 9/1994 | McDaniels et al. | 351/112 |
| 5,407,642 | A | * | 4/1995 | Lord | 422/122 |
| 5,429,335 | A | * | 7/1995 | Cunningham | 248/229.1 |
| 5,564,166 | A | * | 10/1996 | Roy | 24/3.11 |
| 5,651,522 | A | * | 7/1997 | Davis et al. | 248/221.11 |
| 5,860,191 | A | * | 1/1999 | Sieger | 24/3.3 |
| 5,864,924 | A | * | 2/1999 | Rodriguez | 24/3.3 |
| 5,975,476 | A | * | 11/1999 | Mancinelli | 248/316.7 |
| 5,983,459 | A | * | 11/1999 | Goldenberg | 24/3.3 |
| 6,134,753 | A | * | 10/2000 | O'Mahony | 24/3.3 |
| 6,163,894 | A | * | 12/2000 | Simonds | 4/246.1 |
| 6,247,205 | B1 | * | 6/2001 | Damadian et al. | 24/3.12 |
| 6,301,751 | B1 | * | 10/2001 | Ohlson | 24/3.11 |
| D466,292 | S | * | 12/2002 | Hulback et al. | D3/266 |
| 6,510,592 | B1 | * | 1/2003 | Hamilton | 24/170 |
| 6,595,635 | B2 | * | 7/2003 | Schubert | 351/155 |
| 6,938,304 | B2 | * | 9/2005 | Chen | 24/3.12 |
| 7,040,754 | B2 | * | 5/2006 | Hamaker et al. | 351/158 |
| D541,324 | S | * | 4/2007 | Yip et al. | D16/135 |
| 7,296,889 | B2 | * | 11/2007 | Dietz | 351/158 |
| 7,303,276 | B2 | * | 12/2007 | Raymond | 351/158 |
| D585,645 | S | * | 2/2009 | Mchatet | D3/266 |
| 2004/0045133 | A1 | * | 3/2004 | Buettell | 24/3.12 |
| 2008/0313861 | A1 | * | 12/2008 | Clifton, Jr. | 24/3.12 |

* cited by examiner

*Primary Examiner*—Anita M King
*Assistant Examiner*—Nkeisha J Smith
(74) *Attorney, Agent, or Firm*—Albert Bordas, P.A.

(57) ABSTRACT

A clip holder for eyeglasses, comprising a holding assembly comprising a wall. Protruding from the wall are first and second lateral walls having a ridge. Extending from the first and second lateral walls and the ridge is a retaining wall having a front wall. The retaining wall and the front wall merge together and terminate at a top wall. The holding assembly further comprises a bracket that extends from the wall. The ridge and the retaining wall have a cooperative shape and dimension to securely suspend eyeglasses. A swivel assembly comprises a hinge and a base wall. A clip assembly has a base wall and a concave wall. The clip assembly is mounted onto the bushing. The clip assembly is mounted onto a car visor, whereby a sufficient force is placed onto the clip assembly to cause the car visor to squeeze in between the ledge and a base wall.

8 Claims, 3 Drawing Sheets

CLIP HOLDER FOR EYEGLASSES

BACKGROUND OF THE INVENTION

1. Field of the Invention

The present invention relates to clip holders, and more particularly, to a clip holder for eyeglasses that can be mounted onto a car visor for easy access.

2. Description of the Related Art

Often times, especially when driving an automobile or similar vehicle, the driver needs to access his/her eyeglasses for vision improvement, protection against sunlight, or for fashion. Applicant is not aware of a clip holder for eyeglasses that can be mounted onto a car visor for easy access.

SUMMARY OF THE INVENTION

The instant invention is a clip holder for eyeglasses, comprising a holding assembly comprising a wall. Protruding outwardly from the wall are first and second lateral walls having a ridge. Extending from the first and second lateral walls and the ridge is a retaining wall having a front wall. The retaining wall and the front wall merge together and terminate at a top wall. The holding assembly further comprises a bracket that extends from the wall. The ridge and the retaining wall have a cooperative shape and dimension to securely suspend eyeglasses. The retaining wall is a predetermined distance from the wall. A swivel assembly comprises a hinge and a first base wall. The first base wall has a bushing secured thereon by a restraining pin. A clip assembly has a second base wall and a concave wall. The clip assembly is mounted onto the bushing at the first base wall.

The retaining wall is kept in a spaced apart relationship from the wall by the ridge. The swivel assembly is hingedly mounted to the holding assembly by the hinge that is secured at the bracket. The second base wall is sandwiched in between the bushing and the restraining pin. The clip assembly rotates upon a first axle defined by the restraining pin, and the holding assembly rotates upon a second axle defined by the hinge. The concave wall has a ledge that terminates at an end, and the ledge provides a resilient action and is biased against the second base wall. The clip assembly is mounted onto a car visor, whereby a sufficient force is placed onto the clip assembly to cause the car visor to squeeze in between the ledge and the second base wall.

It is therefore one of the main objects of the present invention to provide a clip holder for eyeglasses that can be mounted onto a car visor for easy access.

It is another object of this invention to provide a clip holder for eyeglasses that can be vertically and laterally adjusted.

It is another object of this invention to provide a clip holder for eyeglasses that is volumetrically efficient for transportation and storage.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
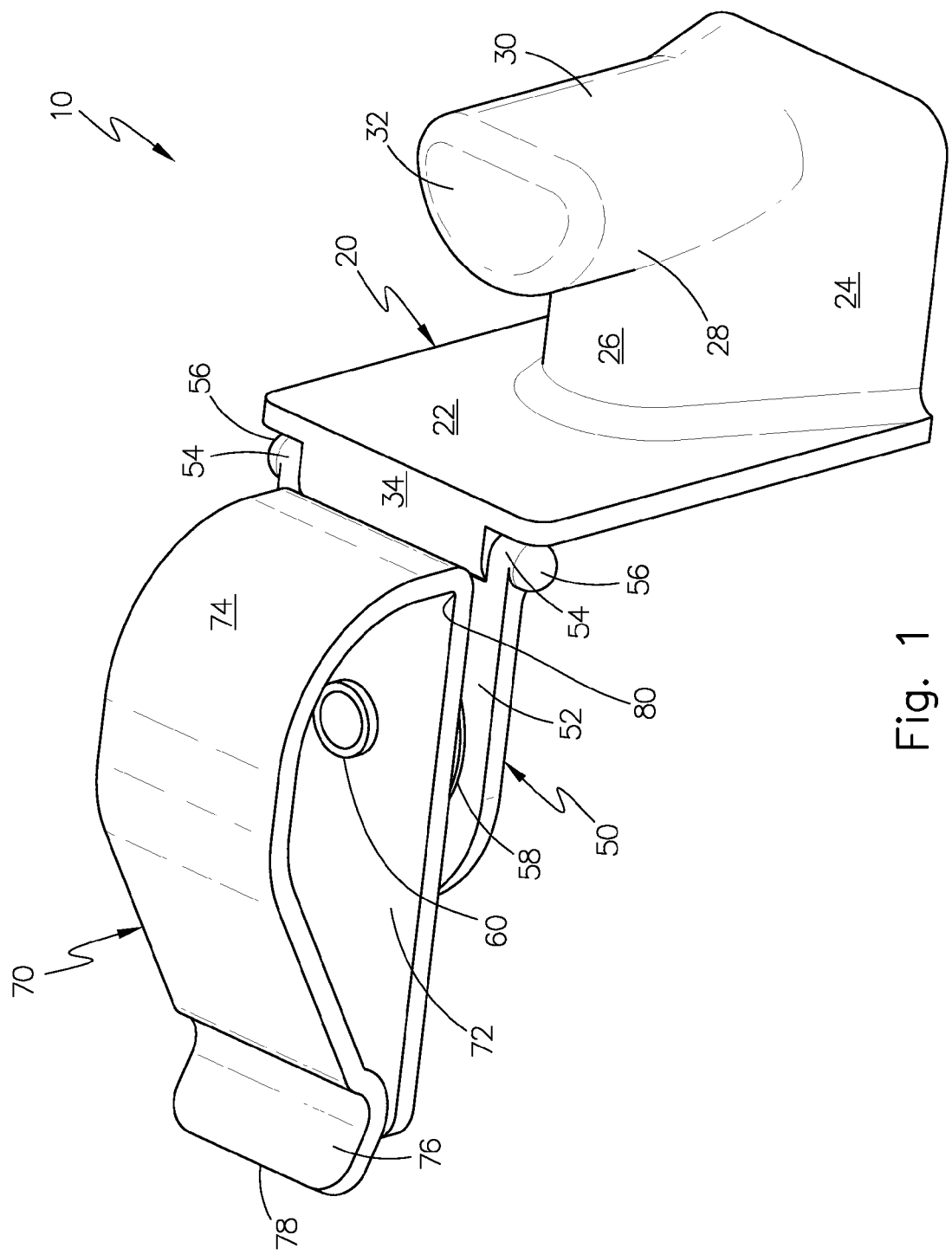
FIG. 1 represents an isometric view of a clip holder for eyeglasses, object of the instant application.

Referring now to the drawings, the clip holder for eyeglasses is generally referred to with numeral 10. It can be observed that it basically includes holding assembly 20, swivel assembly 50, and clip assembly 70.

Figure 2:
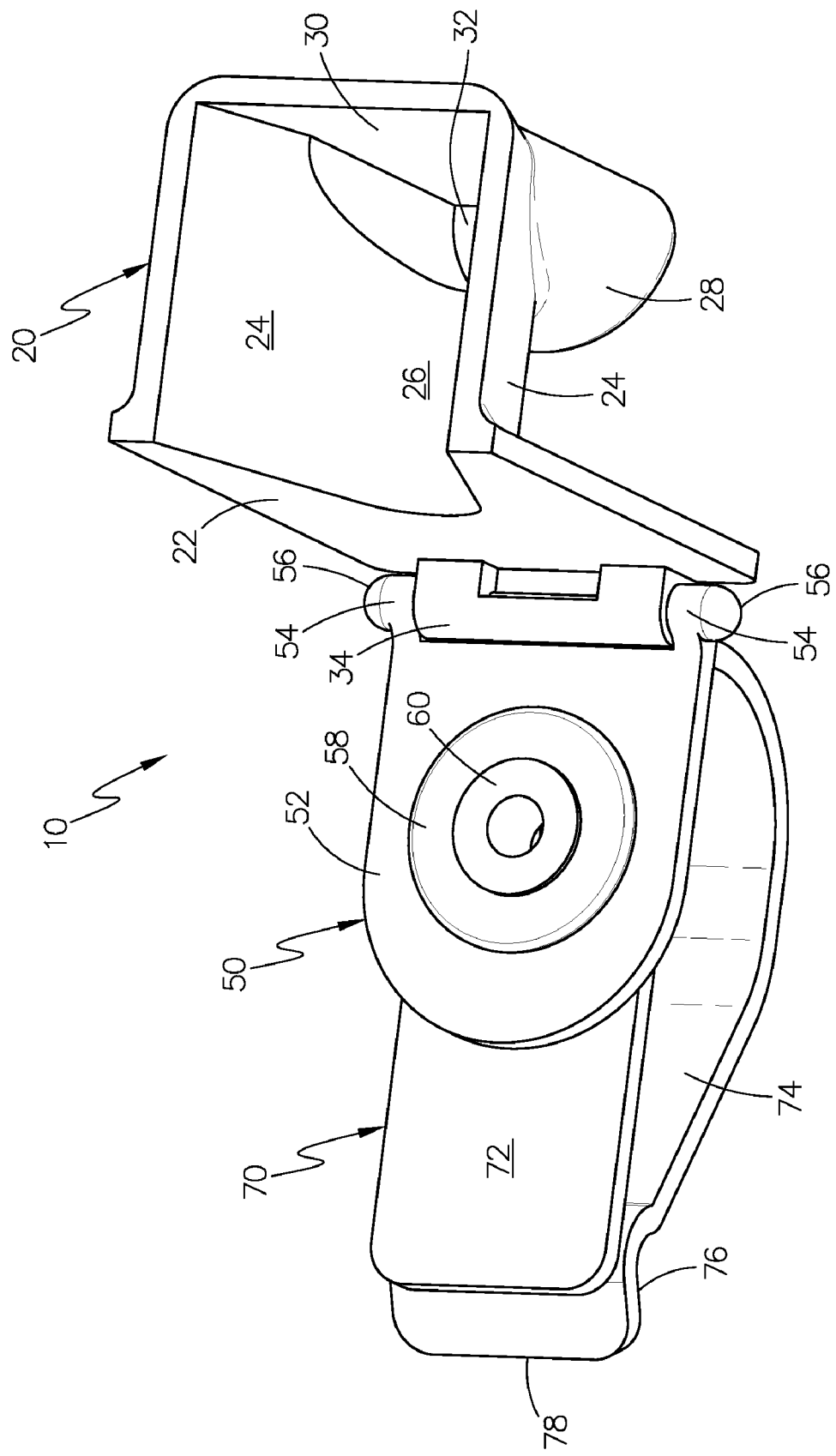
FIG. 2 is a bottom isometric view of the instant invention.

As seen in FIGS. 1 and 2, holding assembly 20 comprises wall 22. Protruding outwardly from wall 22 are lateral walls 24 having ridge 26. Extending from lateral walls 24 and ridge 26 is retaining wall 28 having front wall 30. Retaining wall 28 and front wall 30 merge together and terminate as top wall 32. In the preferred embodiment, retaining wall 28 is a predetermined distance from wall 22 and further is kept in a spaced apart relationship by ridge 26. Extending perpendicularly from an upper edge of wall 22 and opposite in direction from lateral walls 24, is bracket 34.

As better seen in FIG. 2, swivel assembly 50 is hingedly mounted to holding assembly 20 by hinge 54 that is secured at bracket 34. Extending from hinge 54 is base wall 52. End caps 56 cover the ends of hinge 54. Bushing 58 is centrally disposed at base wall 52 and is secured thereon by restraining pin 60.

Clip assembly 70 comprises base wall 72 and concave wall 74 that join at edge 80. Clip assembly 70 is mounted onto bushing 58 at base wall 72, whereby base wall 72 is sandwiched in between bushing 58 and restraining pin 60, as best seen in FIG. 1. In this configuration, clip assembly 70 may rotate upon a first axle defined by restraining pin 60, thus on a horizontal plane. Concave wall 74 has ledge 76 that terminates at end 78. Ledge 76 provides a resilient action and in the preferred embodiment is biased against base wall 72. Clip assembly 70 is made out of a flexible material such as plastic or other material having similar characteristics such as flexibility.

Figure 3:
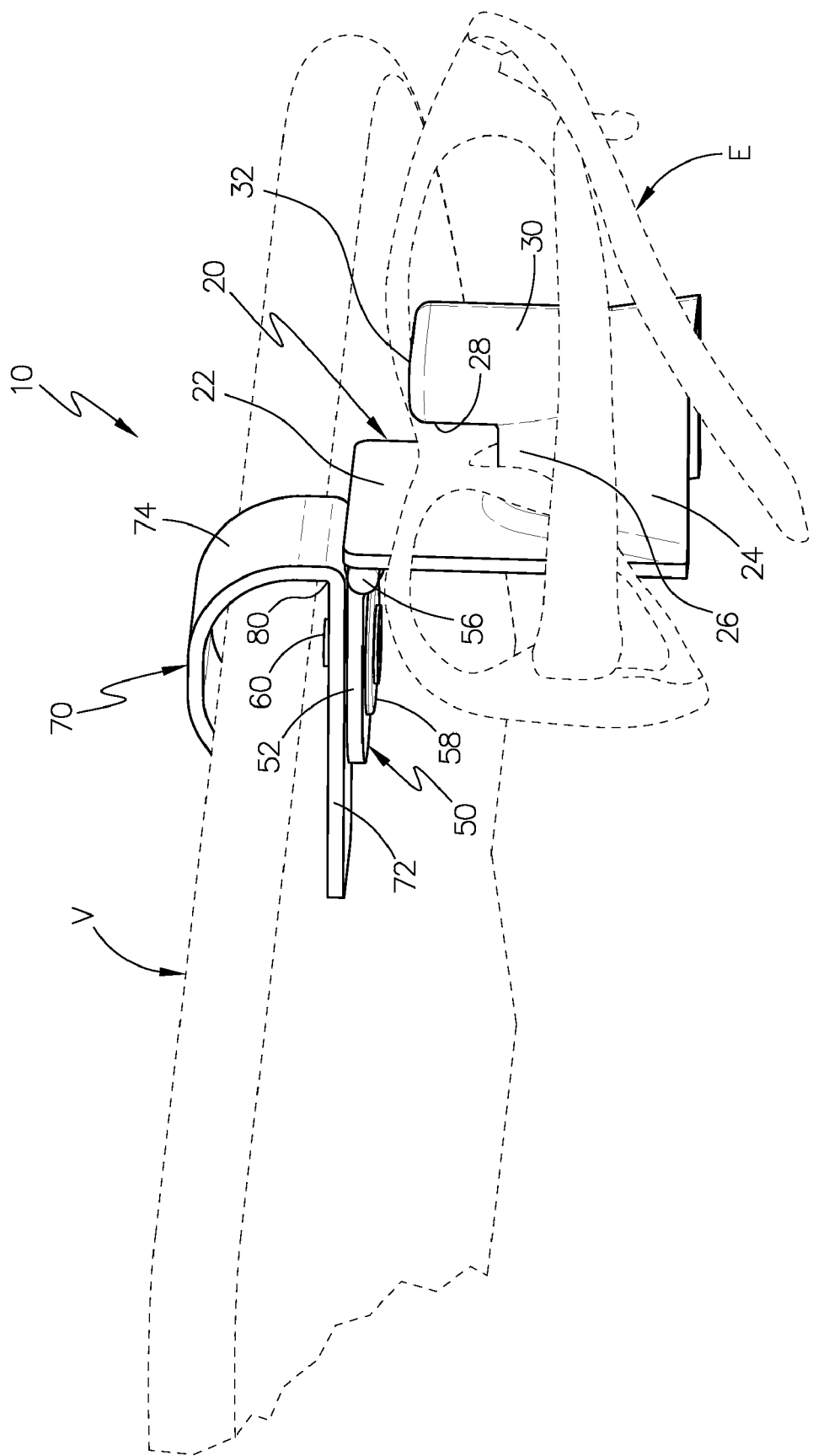
FIG. 3 is an isometric view of the instant invention mounted to a car visor and suspending eyeglasses.

As seen in FIG. 3, clip assembly 70 is mounted onto a car visor V, whereby a sufficient force is placed onto clip assembly 70 to cause visor V to squeeze in between ledge 76 and base wall 72. As seen in this illustration, ridge 26 and retaining wall 28 have a cooperative shape and dimension to securely suspend eyeglasses E. Eyeglasses E may of course be corrective vision glasses, sunglasses, or non-corrective glasses. Once mounted onto visor V, clip assembly 70 may rotate upon the first axle defined by restraining pin 60, thus on a horizontal plane, and holding assembly 20 may rotate upon a second axle defined by hinge 54, thus on a vertical plane.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A clip holder for eyeglasses, consisting of:
   A) a holding assembly comprising a first wall, protruding outwardly from said first wall are first and second lateral walls having a ridge, said ridge approximately perpendicular to said first wall, extending from said first and second lateral walls and said ridge is a retaining wall having a front wall, said retaining wall and said front wall merging together and terminating at a top wall, said holding assembly further comprising a bracket that perpendicularly extends from said first wall in a first opposite direction from said ridge, said bracket positioned above said top wall and said ridge, said ridge and said retaining wall have a cooperative shape and dimension to securely suspend eyeglasses, said retaining wall is a predetermined distance from said first wall, said retaining wall is kept in a spaced apart relationship from said first wall by said ridge;

B) a swivel assembly comprising a hinge and a first base wall, said first base wall having a bushing secured thereon by a restraining pin, said first base wall extends from said hinge in a second opposite direction from said ridge, said swivel assembly is hingedly mounted to said holding assembly by said hinge that is secured at said bracket; and C) a clip assembly having a second base wall and a concave wall, said clip assembly mounted onto said bushing at said first base wall, said second base wall positioned above said first base wall and said bracket, said second base wall is sandwiched in between said bushing and said restraining pin.

2. The clip holder for eyeglasses set forth in claim 1, further characterized in that said clip assembly is made out of plastic.

3. The clip holder for eyeglasses set forth in claim 2, further characterized in that said clip assembly rotates upon a first axle defined by said restraining pin.

4. The clip holder for eyeglasses set forth in claim 3, further characterized in that said holding assembly rotates upon a second axle defined by said hinge.

5. The clip holder for eyeglasses set forth in claim 4, further characterized in that said concave wall has a ledge that terminates at an end.

6. The clip holder for eyeglasses set forth in claim 5, further characterized in that said ledge provides a resilient action and is biased against said second base wall.

7. The clip holder for eyeglasses set forth in claim 6, further characterized in that said clip assembly is mounted onto a car visor, whereby a sufficient force is placed onto said clip assembly to cause said car visor to squeeze in between said ledge and said second base wall.

8. The clip holder for eyeglasses set forth in claim 7, further characterized in that said eyeglasses are corrective vision glasses, sunglasses, or non-corrective glasses.

* * * * *